Nov. 20, 1928.
C. V. KOONS
1,692,666
HYDRAULIC STEERING GEAR
Filed Aug. 8, 1925     2 Sheets-Sheet 1
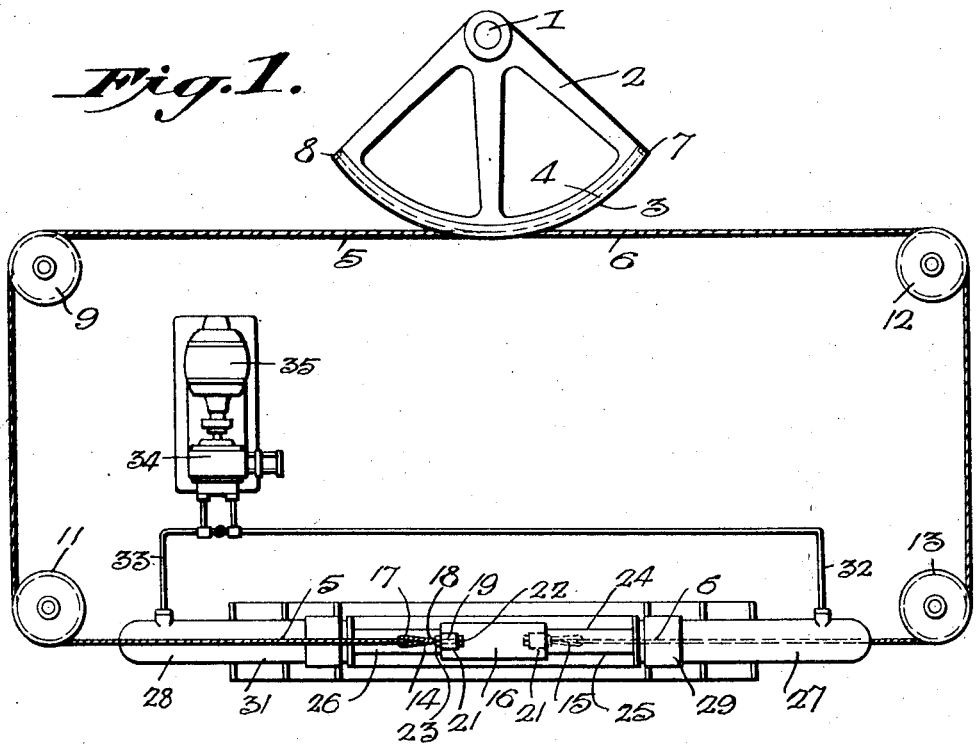
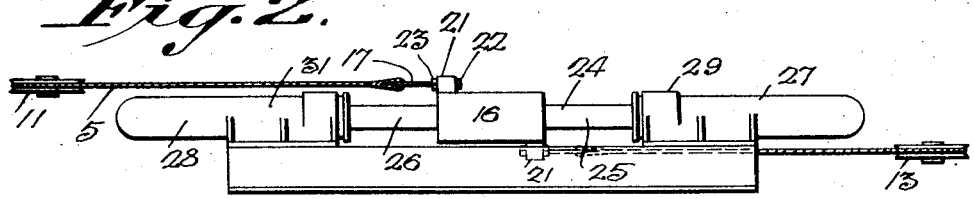
Inventor
Charles V. Koons,
By Howson & Howson
Attorneys.

Nov. 20, 1928.  1,692,666
C. V. KOONS
HYDRAULIC STEERING GEAR
Filed Aug. 8, 1925   2 Sheets-Sheet 2
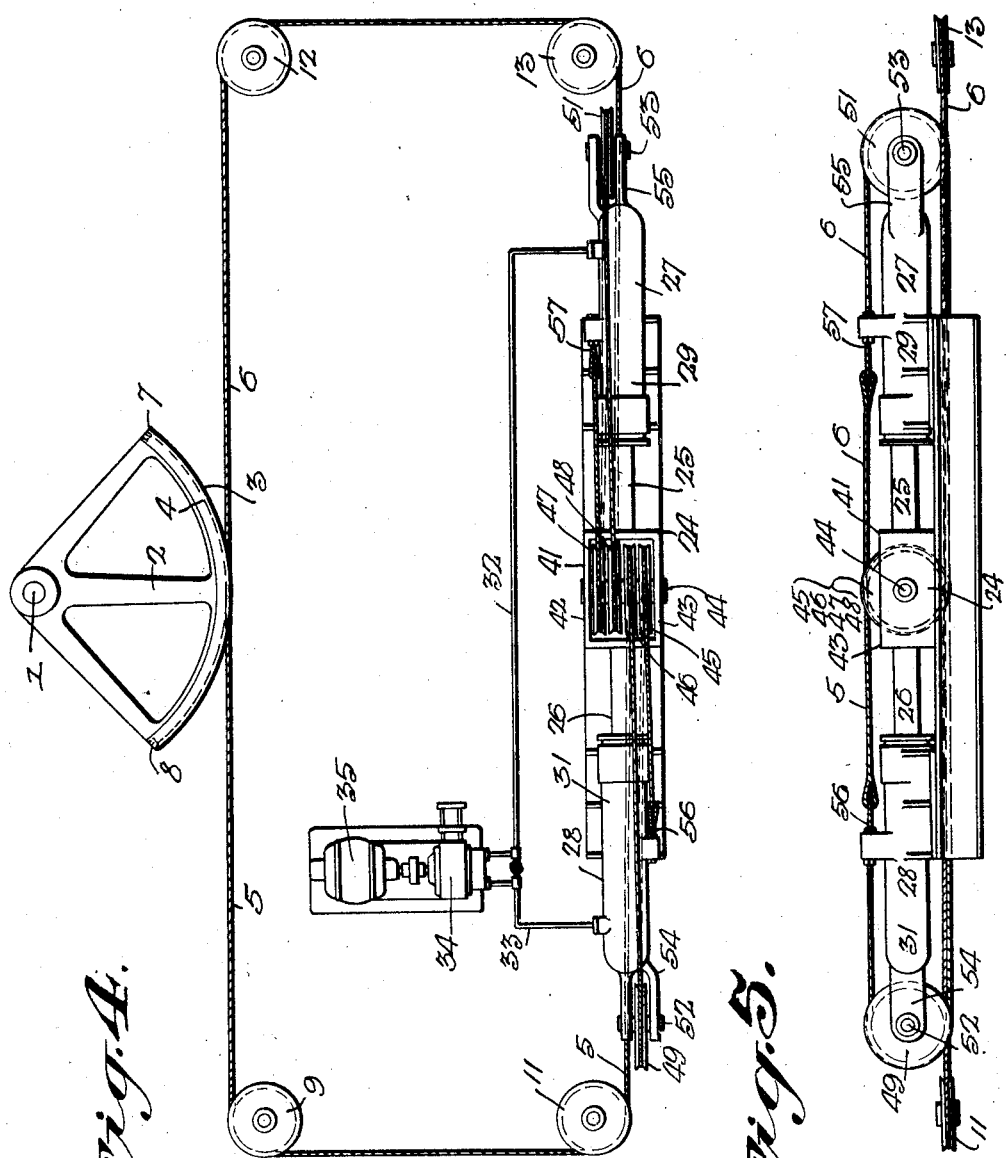
Inventor
Charles V. Koons,
By Howson & Howson
Attorneys Patented Nov. 20, 1928.

1,692,666

UNITED STATES PATENT OFFICE.

CHARLES VERNON KOONS, OF PHILADELPHIA, PENNSYLVANIA, ASSIGNOR TO AMERICAN ENGINEERING COMPANY, OF PHILADELPHIA, PENNSYLVANIA, A CORPORATION OF PENNSYLVANIA.

HYDRAULIC STEERING GEAR.

Application filed August 8, 1925. Serial No. 49,146.

My invention relates to steering apparatus, and it has for one object the provision of a steering gear wherein the driving unit may be positioned on any portion of a ship, independent of the location of the rudder quadrant.

Another object of my invention is to provide a steering gear, wherein the rope or chain connection between the fluid motor and the steering tiller or quadrant may be made with or without purchase or with any desirable inverse purchase.

A further object of my invention is to provide apparatus of the class described, in which the rope slack may be taken up at the driving motor.

Other objects and applications of my invention, as well as details of construction, whereby my invention may be practiced, will be apparent more fully hereinafter, when taken in connection with the accompanying drawings, wherein, Figs. 1 and 2 are plan and side elevational views, respectively, of one form of embodiment of my invention;

Fig. 3 is a detail view of a modification embodying pulley-block mechanism for interconnecting the driving motor and steering element; and Figs. 4 and 5 are views similar to Figs. 1 and 2, but showing a still further alternative embodiment of my invention, wherein the pulley block mechanism has a double inverse purchase.

In the embodiment of my invention shown in Figs. 1 and 2 of the drawing, a steering post 1 is provided with a quadrant 2 having an arcuate outer edge 3 forming a track 4 for a pair of cables 5 and 6, the opposite ends of which are respectively secured at end portions 7 and 8 of the track 4. The cables 5 and 6 respectively extend around pairs of sheaves 9—11 and 12—13, terminating at adjusting means 14 and 15 carried on the upper and lower sides respectively of a block 16.

Each adjusting means comprises a loop 17 through which the end of the cable is threaded and then secured, and it also includes a threaded stem 18 which extends through a perforation 19 in a projecting lug portion 21 of the block 16. The threaded stem 18 may be adjustably secured in any desired position relative to the lug 21 by nuts 22 and 23. The lugs 21—21 project respectively from upper and lower sides of the block 16, as shown in Fig. 2. Thus by loosening the nut 23 and tightening the nut 22 of each adjusting means 14—15, the slack in the cables 5 and 6 may be taken up at a point remote from the steering quadrant 2.

The block 16 may be mounted on a ram element 24, opposite portions 25 and 26 of which extend into cylinders 27 and 28 forming fluid motors 29 and 31, respectively. The motive fluid may be supplied and discharged from the cylinders 27 and 28 through pipes 32 and 33 which lead to a pump 34 preferably of the variable capacity type. The pump 34 may be driven by means of an electric motor 35 or other source of power. The control mechanism for the pump 34 and motor 35 is of usual design and it has not been shown so as not to complicate the description of the present invention.

When the control mechanism above mentioned is so actuated that motive fluid is supplied through the pipe 33 to the fluid motor 31, the ram portion 26 is actuated out of the cylinder 28 and the ram portion 25 is actuated into the cylinder 27, causing a discharge of fluid from the latter cylinder through the pipe 32. The bodily movement of the block 16 causes a force to be applied to the cable 5, so that the steering quadrant 2 is moved clockwise. When the steering quadrant 2 is to be moved in the opposite direction, motive fluid is supplied through the pipe 32 to the fluid motor 29, the resulting operation being then the reverse of that just described.

Under certain conditions of operation, it has been found advisable to establish a differential movement between the steering quadrant 2 and the actuating fluid motors 29 and 31. One such construction, involving a single purchase, is shown in Fig. 3, wherein the cable 5 leading from the quadrant 2, after passing around the guiding sheave 9, is secured to a pivot pin 36 for a sheave 37. A second cable section 38 extends from a fixed support 39 around the sheaves 37 and 11 to the slack-adjusting means 14. A similar pulley-block mechanism (not shown) is associated with the other cable 6. The operation of the present construction is similar to that just described for Figs. 1 and 2, with the exception that the movement of the steering quadrant 2 is one-half that of the operating ram 24, but the force applied to the quadrant 2 by the cables 5 and 6 is doubled.

My invention embodies a still further alternative construction, wherein the differential movement between the quadrant 2 and the driving ram 24 involves a double inverse purchase. As shown in Figs. 4 and 5, this construction requires the replacement of the block 16 of Fig. 1 by a hollow member 41, opposite sides 42 and 43 of which afford a suitable mounting for a pin 44 carrying pairs of sheaves 45—46 and 47—48. The member 41 thus constitutes at least a partial housing for these sheaves. Additional sheaves 49 and 51 are rotatively mounted on pins 52 and 53 supported on end brackets 54 and 55 extending from the cylinders 28 and 27 respectively. The sheaves 49 and 51 may be positioned in the same vertical plane as the sheaves 46 and 48, respectively. As in the preceding figures, the pairs of sheaves 9—11 and 12—13 may be positioned in horizontal planes.

The cable 5 extending from the steering quadrant 22 passes successively around the sheaves 9, 11, 46, 49 and 45 and terminates at adjusting means 56 which corresponds to the adjusting means 14 and 15 of Fig. 1. The cable 6 similarly engages the sheaves 12, 13, 48, 51 and 47 and terminates at adjusting means 57.

When motive fluid is supplied to the cylinder 28, the ram section 26 is forced outwardly causing a bodily movement of the pairs of sheaves 47—48 and 46—45. As a result, force is applied to the cable 5 causing a clockwise movement of the steering quadrant 2. The differential movement between the actuating ram 24 and the steering quadrant 2 is in the ratio 4 to 1, with the force on the quadrant 2 one-fourth that exerted by the ram 24. When motive fluid is supplied to the opposite cylinder 27, the pulley-block mechanism embodying the cable 6 causes a counterclockwise movement of the steering quadrant 2 in the same proportion just described for the clockwise movement.

While I have shown several embodiments of my invention, for the purpose of describing the same and illustrating its principles of construction and operation, it is apparent that still further changes and modifications may be made therein without departing from the spirit of my invention, and I desire, therefore, that only such limitations shall be imposed thereon as are indicated in the appended claims or as are demanded by the prior art.

I claim:

1. A pair of spaced motors having a common ram extending therebetween, a portion of said ram intermediate said motors being recessed to receive a sheave, and means for supporting said sheave in said recess.

2. A steering gear comprising a pair of spaced motors having a common ram extending therebetween, the portion of said ram intermediate said motors being provided with a recess, a pin positioned in said recess and supported in the walls thereof, and a sheave mounted on said pin.

3. A pair of spaced motors having a common ram extending therebetween, and a sheave, a portion of said ram intermediate said motors being provided with a hollow portion constituting at least a partial housing for said sheave.

4. A pair of spaced motors having a common ram extending therebetween, a sheave, a portion of said ram intermediate said motors being provided with a hollow portion constituting at least a partial housing for said sheave, and sheaves mounted on the opposite ends of said spaced motors, respectively.

CHARLES VERNON KOONS.